(12) United States Patent
Smith et al.

(10) Patent No.: US 7,331,870 B2
(45) Date of Patent: Feb. 19, 2008

(54) MULTIPLAYER BIOFEEDBACK INTERACTIVE GAMING ENVIRONMENT

(75) Inventors: Kurt Smith, Boulder, CO (US); Crowin Bell, Boulder, CO (US)

(73) Assignee: Healing Rhythms, LLC, Boulder, CO (US)

( * ) Notice: Subject to any disclaimer, the term of this patent is extended or adjusted under 35 U.S.C. 154(b) by 0 days.

(21) Appl. No.: 10/816,689

(22) Filed: Apr. 1, 2004

(65) Prior Publication Data
US 2004/0229685 A1   Nov. 18, 2004

Related U.S. Application Data

(60) Provisional application No. 60/471,112, filed on May 16, 2003.

(51) Int. Cl.
| A63F 13/00 | (2006.01) |
|---|---|
| A63F 9/24 | (2006.01) |
| A63F 13/02 | (2006.01) |
| A63F 9/00 | (2006.01) |
| G60F 17/00 | (2006.01) |
| G60F 19/00 | (2006.01) |
| A63B 71/00 | (2006.01) |

(52) U.S. Cl. ............................ 463/36; 463/1; 463/23; 463/39; 463/40; 273/148 R; 273/148 B

(58) Field of Classification Search .................... 463/1, 463/2, 29–43; 434/262, 265, 236–238
See application file for complete search history.

(56) References Cited

U.S. PATENT DOCUMENTS

| 3,855,998 | A | * | 12/1974 | Hidalgo-Briceno | ......... 600/545 |
| 4,358,118 | A | | 11/1982 | Plapp | |
| 5,016,213 | A | | 5/1991 | Dilts et al. | |
| 5,672,107 | A | | 9/1997 | Clayman | |
| 5,769,415 | A | | 6/1998 | Yamazaki et al. | |
| 5,772,508 | A | | 6/1998 | Sugita et al. | |
| 5,813,014 | A | * | 9/1998 | Gustman | ................ 707/103 R |
| 5,860,860 | A | | 1/1999 | Clayman | |
| 5,896,164 | A | | 4/1999 | Orbach et al. | |
| 5,964,660 | A | * | 10/1999 | James et al. | .................... 463/1 |
| 5,970,143 | A | * | 10/1999 | Schneier et al. | ............ 713/181 |
| 6,001,065 | A | * | 12/1999 | DeVito | ....................... 600/544 |
| 6,026,322 | A | | 2/2000 | Korenman et al. | |
| 6,067,468 | A | | 5/2000 | Korenman et al. | |
| 6,152,824 | A | * | 11/2000 | Rothschild et al. | ........... 463/42 |
| 6,254,536 | B1 | * | 7/2001 | DeVito | ....................... 600/300 |
| 6,309,342 | B1 | * | 10/2001 | Blazey et al. | ................. 600/26 |
| 6,358,201 | B1 | | 3/2002 | Childre et al. | |
| 6,450,820 | B1 | * | 9/2002 | Palsson et al. | .............. 434/236 |
| 6,520,905 | B1 | * | 2/2003 | Surve et al. | .................. 600/26 |
| 6,527,700 | B1 | * | 3/2003 | Manico et al. | ................ 600/26 |
| 6,554,763 | B1 | * | 4/2003 | Amano et al. | ................ 600/26 |

(Continued)

Primary Examiner—Robert E. Pezzuto
Assistant Examiner—Binh-An D Nguyen
(74) Attorney, Agent, or Firm—Holland & Hart

(57) ABSTRACT

The present invention provides a method and apparatus in which a biometric information relating to a player is used to facilitate game play in multiplayer game environments. In particular, the present invention provides a game platform, a biofeedback sensor, and a biofeedback signal interface connection between the game platform and the biofeedback sensor. The biofeedback signal interface converts the biofeedback sensor information into a signal input usable by the game platform, which executes multimedia events as determined, in part, by the biometric information.

25 Claims, 6 Drawing Sheets

U.S. PATENT DOCUMENTS 6,623,427 B2 * 9/2003 Mandigo ............... 600/300
6,792,304 B1 * 9/2004 Silberstein ............ 600/544

2003/0060728 A1 3/2003 Mandigo

* cited by examiner

MULTIPLAYER BIOFEEDBACK INTERACTIVE GAMING ENVIRONMENT

The present invention claims the benefit of U.S. Provisional Patent Application 60/471,112, titled BIOFEEDBACK INTERACTIVE GAMING ENVIRONMENT, filed May 16, 2003, incorporated herein by reference.

FIELD OF THE INVENTION

The present invention relates to electronic games and, more particularly, to a biofeedback system where biofeedback information relating to physical state of one or more players is used to accomplish tasks and controls an electronic gaming environment.

BACKGROUND OF THE INVENTION

Conventional electronic games are generally well known in the art. In these electronic games, a game is loaded into a game platform, and the game progresses according to a programmed sequence of events (a.k.a. "multimedia events"). The sequence of events may be graphics, audio, text, imagines, video, audiovisual, or the like. During the game progress, the player frequently can interact with the game using a conventional input/output device, such as a keyboard, a joystick, a mouse, a game pad, or the like (a.k.a. conventional bios systems). The player's interaction with the game typically involves choices, such as, selecting the green door or the red door, or hand-eye coordination, such as moving a player using a joystick. Sometimes, the game will require the user to complete a task or solve a puzzle, but the player still interacts with the game programming using physical acts input through conventional bios devices.

Gaming companies have been attempting to increase the enjoyment of game play for a user by monitoring the physical state of the user. For example, U.S. Pat. No. 5,772,508, titled GAME OR PLAY FACILITIES CONTROLLED BY PHYSIOLOGICAL INFORMATION, issued on Jun. 30, 1998, to Sugita et al., incorporated herein by reference, describes an electronic game that monitors an excitement level of a user. The electronic game uses the monitored excitement level, which is based on physiological information related to the user, to select the next sequence in the game to maintain a consistent excitement level for the user. In other words, if the user is experiencing heightened excitement, the next sequence would be a less exciting sequence. Whereas, if the user was experiencing lessened excitement, the next sequence would be a more exciting sequence.

Similarly, U.S. pending patent application Ser. No. 09/963,187, titled BIOFEEDBACK BASED PERSONAL ENTERTAINMENT SYSTEM, filed by Mandigo on Sep. 25, 2001, published on Mar. 27, 2003 (2003/0060728), incorporated herein by reference, describes an entertainment system that uses biofeedback to determine a "mood" of the user. Based on the user's mood, the entertainment system picks an appropriate style of entertainment, such as jazz music for a peaceful mood, or the like.

Unlike the above biofeedback gaming systems, some biofeedback systems provide increased physical responses based on the player's physiological status. For example, U.S. Pat. No. 6,450,820, titled METHOD AND APPARATUS FOR ENCOURAGING PHYSIOLOGICAL SELF-REGULATION THROUGH MODULATION OF AN OPERATOR'S CONTROL INPUT TO A VIDEO GAME OR TRAINING SIMULATOR, issued on Sep. 17, 2002, to Palsson et al. provides a biofeedback control system that monitors the player's physiological state to cause a conventional game controller to change the default response characteristics. For example, if the biofeedback monitor indicates the player is getting lax, the system may cause the joystick controls to become more difficult to operate.

The above gaming systems provide some incentive for a player to regulate physiological conditions of the body. For example, a player who wishes to hear jazz music, will have some incentive to become peaceful. However, none of systems are designed to teach a player how to regulate personal biometrics to establish control over the gaming environment and, hence, the player's physiologic status. So, while users may acknowledge the need to become peaceful, they would have no information or training tending to inform them how to regulate their bodies into a peaceful state. Further, no existing gaming systems use biometric information from multiple users games, such as on-line mass multiplayer games, to influence the game environment. Thus, it would be desirous to develop an electronic gaming environment designed to train users to regulate their physiological conditions either in isolation or collectively.

SUMMARY OF THE INVENTION

To attain the advantage of and in accordance with the purpose of the present invention, methods of playing a multiplayer game having a biofeedback component is provided. The method comprises displaying multimedia events to a plurality of users. The method further comprises receiving biometric input from at least one of the users and calculating a game score based on the biometric received. Using the calculated game score, at least a second multimedia event is generated and displayed to the plurality of users.

The present invention further provides apparatuses to play a multiplayer game having a biometric component. The apparatus comprises a game platform having a multimedia event engine to generate multimedia events displayable to users. At least one input to the game platform includes a biometric signal input. An event generation engine uses the biometric signal input to generate the event sequence, which is used by the multimedia event engine to generate and display multimedia events.

The foregoing and other features, utilities and advantages of the invention will be apparent from the following more particular description of an embodiment of the invention as illustrated in the accompanying drawings.

BRIEF DESCRIPTION OF THE DRAWING

The accompanying drawings, which are incorporated in and constitute a part of this specification, illustrate embodiments of the present invention, and together with the description, serve to explain the principles thereof. Like items in the drawings are referred to using the same numerical reference.

DETAILED DESCRIPTION

Figure 1:
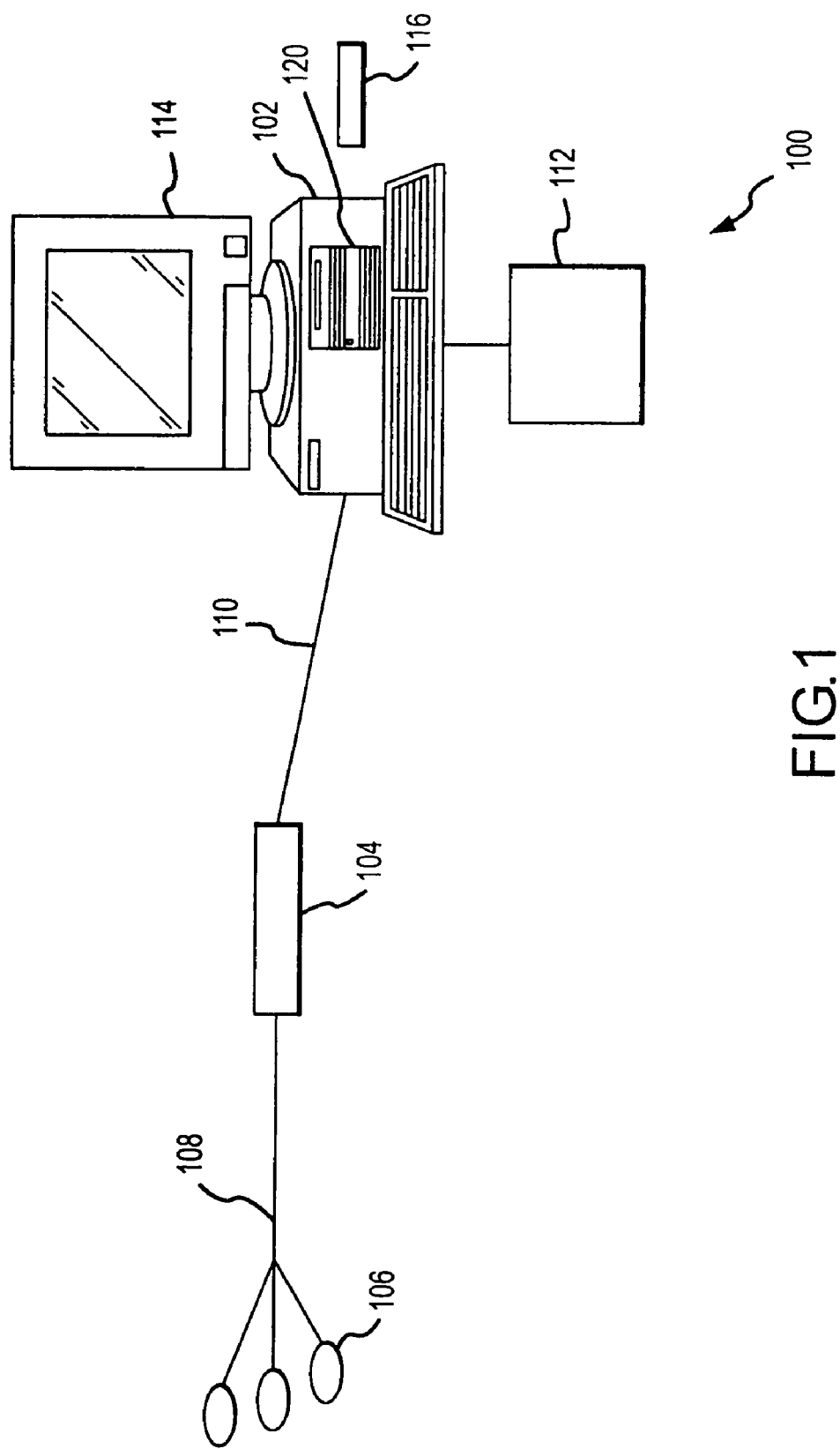
FIG. 1 is a functional block diagram of a gaming environment consistent with the present invention.

An embodiment of the present invention will be described with reference to FIGS. 1 to 7. FIG. 1 is a functional block diagram of a biofeedback gaming environment 100 useful for an individual playing a single player biofeedback game. Biofeedback gaming environment 100 includes a game platform 102, a biofeedback signal interface 104, and a plurality of biofeedback sensors 106. Biofeedback wiring harness 108 connects the biofeedback, sensors 106 to biofeedback signal interface 104. Biofeedback signal interface 104 can be connected to game platform 102 by a standard cable 110, such as a coaxial cable, a universal serial bus (USB) cable, an optical cable, or the like. Biofeedback signal interface 104 and game platform 102 could be integrated into one or more parts or processors. If biofeedback signal interface 104 were incorporated into game platform 102, cable 110 would likely be replaced by other communication protocols, such as a bus. Also, wiring harness 108 and cable 110 could be replaced by a wireless communication links if desired. Further, game platform 102 could incorporate a web browser and server to allow downloading or streaming the game program over a network, such as, a local area network, an Ethernet, a wide area network, a wireless network, the Internet, or the World Wide Web, which will be explained further below.

Biofeedback signal interface 104 converts biofeedback information from an individual into signals that can be processed by gaming platform 102. The operation of biofeedback signal interface 104 is well known in the art and will not be further explained herein, except as it relates specifically to the present invention.

Game platform 102 could be any conventional game platform, such as, for example, a personal computer, a Sony PLAYSTATION2™, a Microsoft XBOX™, a Nintendo GAMECUBE™, a portable electronic game, a PDA, cellular telephone, a wireless device, a network connection, a server, or the like. The game platform would operate in a manner similar to existing game platforms by loading the game program into the system. Game platform 102 would execute a game program, which would include receiving input from bios inputs, biofeedback input, and using those inputs by a multimedia event engine to generate a series of multimedia stimulus, such as images, sounds, audiovisual displays, graphics, still pictures, animations, and the like, or a combination thereof. It is envisioned that game platform 102 would have a conventional bios devices 112, such as a joystick, keyboard, or mouse, and a conventional display 114, such as a computer monitor, T.V., LCD, or the like. This would allow game platform 102 to operate in a conventional manner with a conventional game program. Further, it is envisioned that various parts of the present invention would function as a typical electronic game. Alternatively, the conventional bios device could be removed from game platform 102 such that biofeedback interface 104 provides the only input. Notice, multiple combinations of bios devices and biofeedback interfaces 104 are possible. The game program could be loaded in a remote server and processor with the multimedia images streamed or downloaded to a local display for a player in a conventional manner. (See FIG. 3) Alternatively, the game program could be stored on a media 116 and loaded into an appropriate drive 120 of game platform 102. Media 116 and corresponding drive 120 could be any conventional protocols, such as, conventional magnetic discs, optical discs, tapes, CDs, DVDs, or the like.

It is envisioned that biofeedback sensors 106 will be a plurality of ring type sensors capable of fitting on the fingers of users. For example, two sensors may measure skin conductance. Measuring skin conductance provides an epidural skin response (also known as EDR or GSR) input of the player to game platform 102. Epidural skin response measures, for example, the stress level of the player. Epidural skin response sensors are well known in the art and useful for devices, such as, lie detectors. Another sensor may be an infrared senor that may measure the player's heartbeat. Infrared sensors of this sort are also well known in the art. Measuring the player's heartbeat can be useful in determining a variable heart rate. The variable heart rate could be useful in determining, for example, the coherence between the player's sympathetic and parasympathetic nervous systems. While three sensors to determine two biometric values have been described, other combinations of sensors and other biometrics are possible. For example, biometrics could be measured for blood press, temperature, EKGs, EEGs, EMGs, brain waves, blood oxygen levels, respiratory rates, or the like. Also, the game play could be based on one or more biometric values measured using one or more biometric sensor. In other words, you could have a game where only one biometric, such as, a respiratory rate, is measured. Alternatively, you could have a game where two or more biometrics are measured at various times. Still further, a game could be designed where two biometrics are measured at substantially the same time, such as, a combination or variable heart rate and respiratory rates. In other words, the combination of sensors and biometrics is a matter of design choice.

Biofeedback sensors 106 would sense the particular biometric value of concern and send the raw biometric data to biofeedback interface 104. For example, the heart beat sensor would send representative signal, such as counts per minute, to biofeedback interface 104. Biofeedback interface 104 converts the raw biometric data into a biometric game input signal, which may correspond to a variable heart rate, and transmits that signal to game platform 102. We note here that the function of biofeedback interface 104 could be contained in biofeedback sensors 106 circuitry, contained on a peripheral circuit card inserted into game platform 102, or performed by the game platform 102 itself. Game platform 102 would use the biometric game input signal to accomplish tasks or to control the game environment. For example, if a particular task in the game program was to cause a hot air balloon to rise to a particular level based on particular decrease in the player's stress level as measured by EDR, then biometric sensors 106 would measure skin conductance. Biofeedback interface would receive the raw biometric data and convert it to a biometric game input, which in this case would be a stress indicator. Game platform 102 would receive the biometric game input and cause the balloon to rise up a predetermined amount for a corresponding decrease in stress as indicated by the differential of conductance values. For example, if the player's stress decreases such that the sensors may indicate a 10 micromho change in skin conductance. The 10 micromho change in skin conductance may correspond to a 10 foot increase in the balloon's altitude. Another task may be, for example, achieving a particular variable heart rate to cause a game door to open. Still another task may be requiring a particular respiratory rate to float on a body of water or travel down a hall. While desirable to have some coordination between the game task and a particular or combination of physiological characteristics is desirable, it is also not necessary. For example, a low heart rate may cause a game character to run faster, which is not intuitive. Generally, the biometric and the associated task is a matter of design choice.

Figure 2:
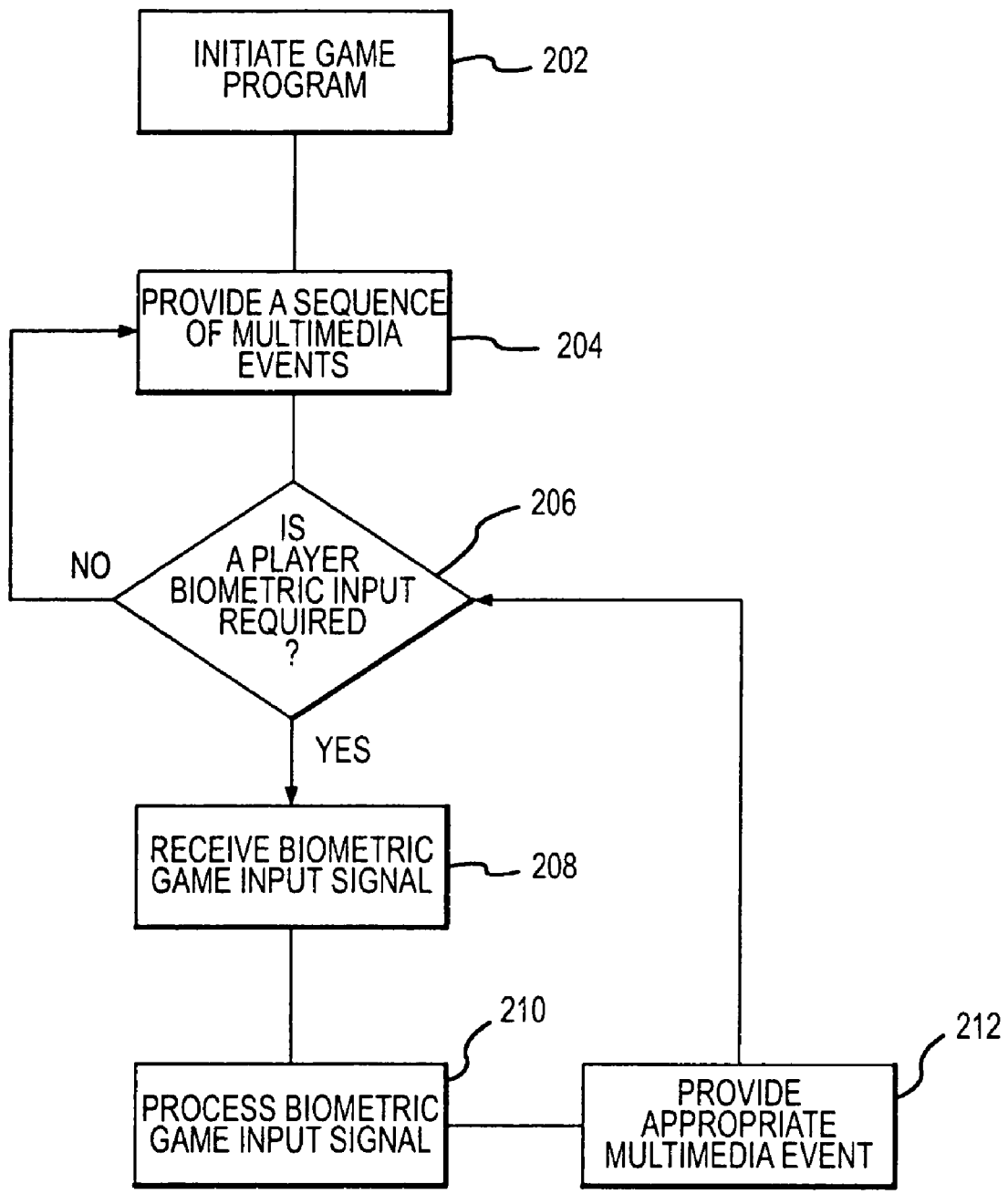
FIG. 2 is a representative flowchart illustrative of a method of playing the present invention.

FIG. 2 shows a flowchart 200 illustrative of a possible game play using the present invention. First, a game program is initiated on game platform 102, step 202. After the game program is initiated, game play begins by providing a first multimedia event, step 204. The first multimedia event may be a single event (such as a still image) or a sequence of multimedia events. During the game play, the system continually or periodically monitors the game to determine whether the game program requires a user biometric input, step 206. If a biometric input is not required, game play returns to providing multimedia events, step 204. (While shown as separate steps for ease of illustration, one of skill in the art would recognize on reading the disclosure that the display of multimedia events does not necessarily pause when the game play requires input and biofeedback input, and multimedia display can occur in discrete steps, simultaneously, substantially simultaneously, or a combination thereof). Further, while waiting for or processing, or in conjunction with a biometric input, a player could manipulate game play using conventional bios devices.

If a biometric input is required for game play, the game program receives the biometric game input signal, step 208. The biometric game input signal is processed by game platform 102, step 210. Based on the processed signal, game platform 102 provides an appropriate multimedia event, step 212. The appropriate multimedia event is at least a second multimedia event or sequence of multimedia events. After providing the appropriate multimedia event based on the biometric input, the game play system determines whether additional biometric input is required, step 206. While not specifically shown, game play termination could be provided after any particular multimedia event, according to conventional methods.

Although the above description generally relates to a single player or user interacting with the game environment, it would be possible to establish a collective or competitive game play, which will be explained in more detail below. For example, referring back to FIG. 1, instead of one set of biometric sensors 106 providing input to biofeedback signal interface 104, two or more sets of sensors 106 could provide input to one or more interfaces 104. For example, assuming that sensors 106 were configured to measure EDR, then the interface (or interfaces) 104 could supply each of the two or more player's EDR biometric game input signal to game platform 102 or interface 104 could combine the signal into a collective player signal to supply a collective biometric game input signal to game platform 102. If the biometric game input signals for the individual players are transmitted to game platform 102, then the game platform 102 may be programmed to develop a collective biometric game input signal. Using the hot air balloon example, if three players are playing together, the game program may be designed to only increase the balloon's height when the players collectively reach certain biometric values, i.e., all three players need to collectively reduce their stress level to cause the balloon to rise. If one or two players reduce their stress, the balloon may move somewhat, but the goal is only reached if the community of players works together. For competitive play, one player's stress reduction may cause the balloon to rise while the second player's stress variable heart rate may cause the balloon to lower (or the wall to increase in height). Again, the combinations of collective and competitive tasks are limited by the game programmers imagination. While collective and competitive multiple player games can be played by players at the same location, collective or competitive players can be located at remote locations through use of any type of computer network such as local-area networks, the world-wide web, telephony networks or wide-area networks, any of which could be wired or wireless.

Figure 3:
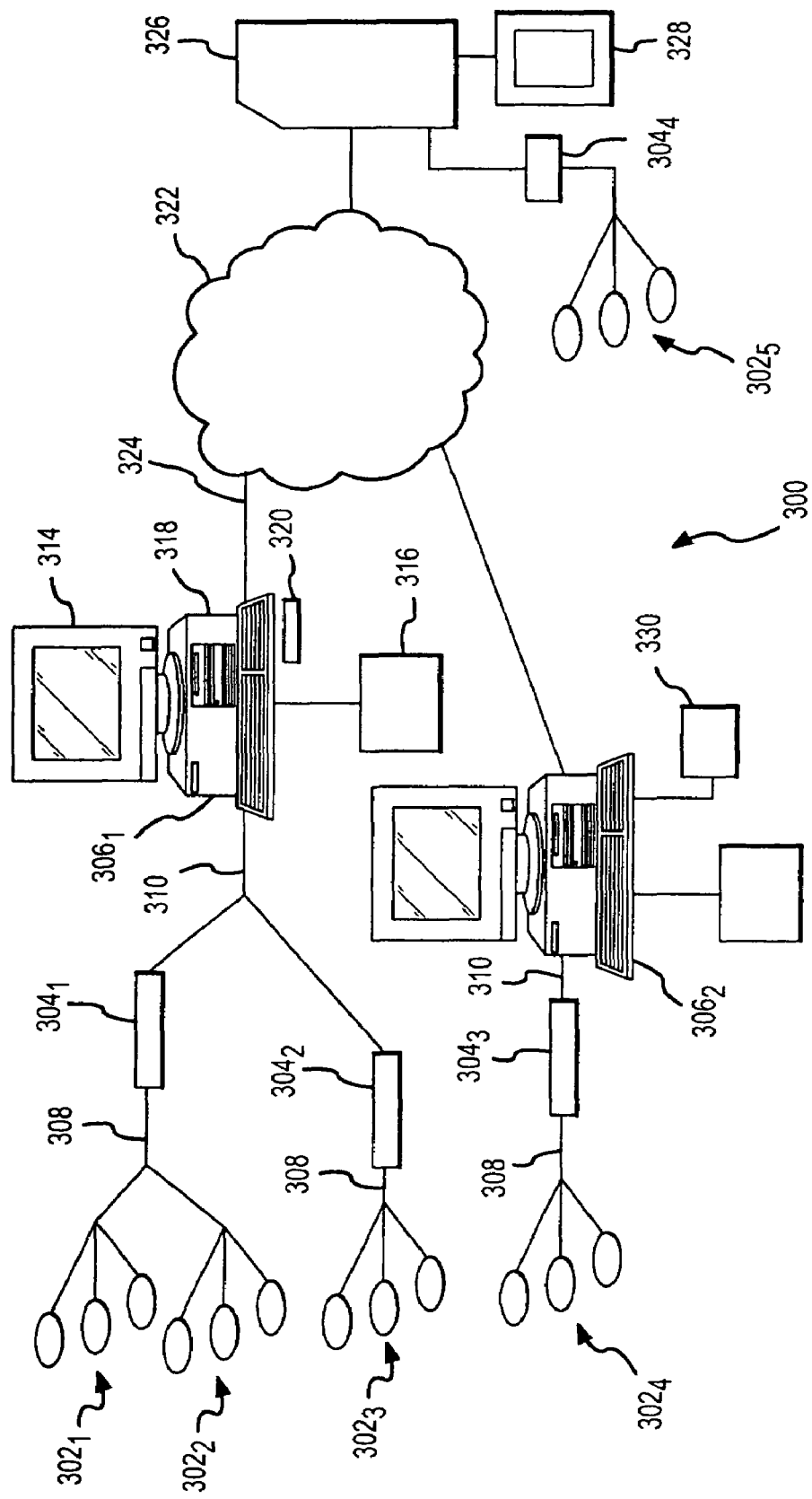
FIG. 3 is a functional block diagram of a multiplayer gaming environment consistent with the present invention.

Referring now to FIG. 3, a multiplayer biofeedback gaming system 300 is shown in more detail. Biofeedback gaming system 300 includes a plurality of biofeedback sensors $302_1$ to $302_5$, a plurality of biofeedback signal interfaces $304_1$ to $304_4$, and a plurality of game platforms $306_1$ to $306_2$. Each game platform 306 may be connected to a conventional BIOS 330 (of which only one is shown) such that any game being played can accept biofeedback input as well as conventional game input.

A plurality of biofeedback wiring harnesses 308 connect sensors 302 to interfaces 304. Wiring harnesses 308 can be conventional cables, fibers, or wireless connections. If interfaces 304 are integrated into sensors 302, wiring harness 308 could be buses or the like. A plurality of connections 310 connect interfaces 304 to game platforms 306. Connections 310 can be any number of conventional devices such as, for example, cables, fibers, wireless, buses, or the like. Game platforms 306 generally include displays 314, memory 316, computer medium drives 318 capable of reading code stored on computer medium 320. Computer medium drive 318 is generally designed to read computer medium 320. Such medium could be, for example, a magnetic disk, an optical disk, a tape, CDs, DVDs, or the like. Game platforms 306 operate in a conventional manner to process a game program such that a user can interact with a variety of multimedia events using conventional Bios 330 or biometric inputs (sensors 302, interfaces 304, and the like).

Multiple biofeedback sensors can be connected to a single interface, such, as biofeedback sensors $302_1$ and $302_2$ are connected to a single biofeedback signal interface $304_1$. Moreover, multiple biofeedback signal interfaces connected to one or more biofeedback sensors can be connected to a single game platform 306, such as, for example, biofeedback signal interface $304_1$ (with two sensor inputs) and biofeedback signal interface $304_2$ having an input from biofeedback sensor $302_3$, are both connected to game platform $306_1$. Game platform $306_1$ is capable of running the software and processing the signals for a biofeedback game either stored in memory 316 or read from a computer medium 320 loaded in computer medium drive 318. Thus, multiple players using multiple biofeedback sensors 302 and one or more interfaces 304 can play the game on a single local game platform $306_1$.

Instead of running the game locally, game platform $306_1$ could establish a connection to a network 322 using a conventional network connection 324. Server 326, also connected to network 322, accepts input from game platform $306_1$ and $306_2$ and provides output back to the game platforms to be displayed on the respective displays 314. Two-way connections between game platform 306 and server 326 are generally known in the art and will not be further explained herein. Server 326 may be a game platform as well with a local player connected via a biofeedback sensor $302_5$ and biofeedback signal interface $304_4$. The local player would use a local display 328. While only one local player is shown, multiple players may be connected directly to server 326.

Network 322 can be a local area network, a wide area network, a wireless network, an Ethernet, the Internet, the World Wide Web, a combination thereof, or the like. Data transfer and game playing would follow conventional protocols similar to massive on-line multiplayer games, such as, Ultima™ Online and Everquest™.

Figure 4:
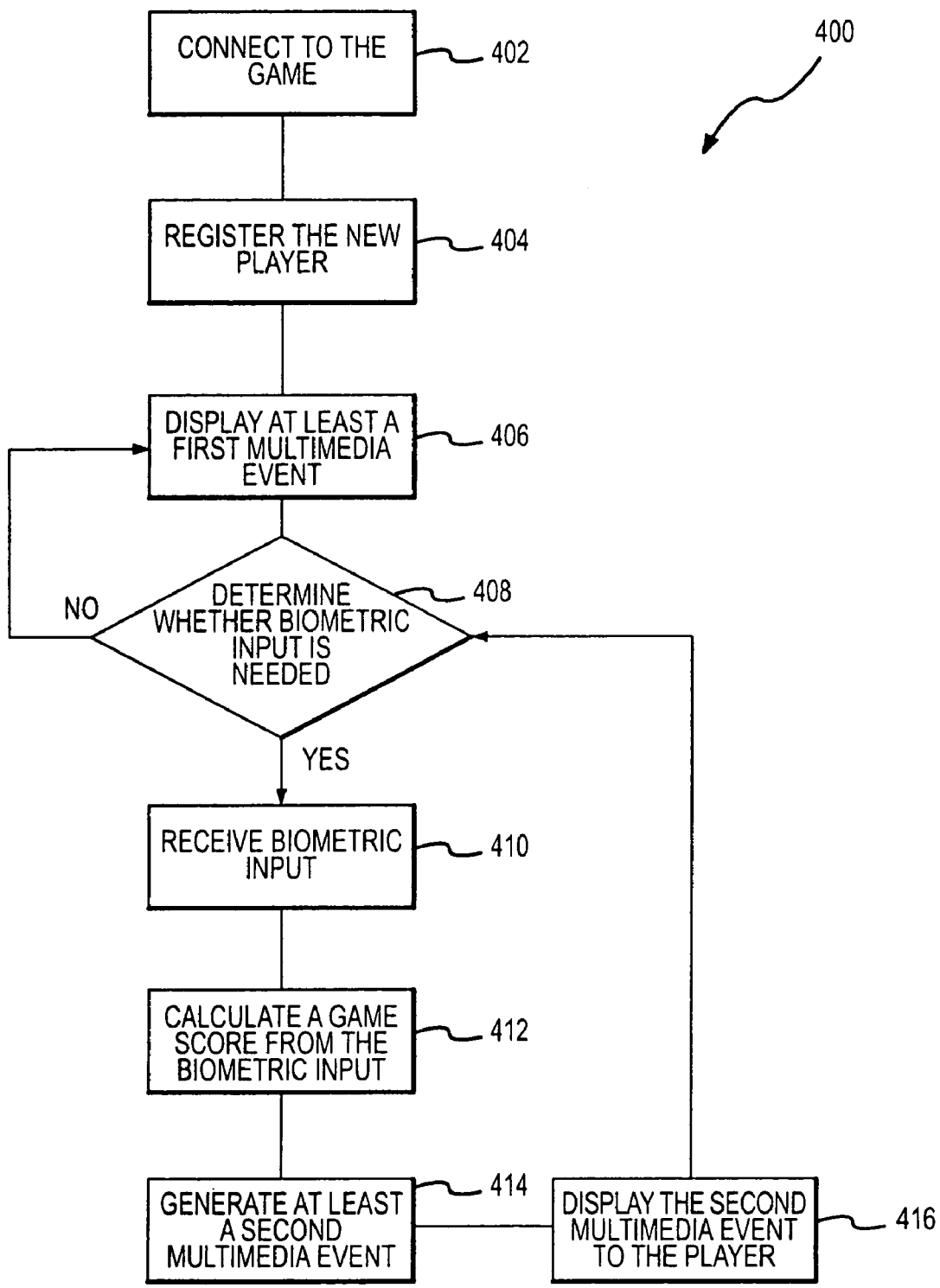
FIG. 4 is a representative flowchart illustrative of a method of playing the present invention in a multiplayer gaming environment.

Referring now to FIG. 4, a flowchart 400 illustrates a possible methodology associated with multiplayer biofeedback game 300. Flowchart 400 assumes play is over network 322 where server 326 is processing the game and providing the multimedia events to the players, but one of ordinary skill in the art would recognize on reading the disclosure that multiple players could play the game on a single processor. Generally with networked games, the game simulation is running, thus the first step for any individual player is to connect to the game, step 402. The game registers the new player, step 404. For example, the game may register one player per processor. However, when multiple players connect to one processor, players can be identified as a single player or as a composite of multiple players. In other words, referring to FIG. 3, processor $306_1$ receives input from biofeedback sensors $302_1$, $302_2$, and $302_3$. Processor $306_1$ could process the various biofeedback inputs into a single composite player signal (forming the composite signals will be explained in more detail below), provide multiple player signals to server 326, or form a composite signal from sensors $302_1$ and $302_3$ and send two player signals, the composite and player $302_2$ as two separate players. Once the connection is established and the player (or players) is (are) registered, at least a first multimedia event is sent to and displayed at the display of the player (players and users are often used interchangeably herein), step 406. The first multimedia event could be a single event or a sequence of events.

During the course of play, the program will determine whether biometric input is needed, step 408. When it is determined that a biometric input is needed, the system receives biometric input, step 410. Next, the system calculates a game score from the received biometric input, step 412. The game score may be a game score developed from a composite of biometric inputs, see below. Alternatively to developing the composite signal from all the registered players, biometric signals from a subset of registered players could be used to develop the composite signal. For example, players may be grouped into player group A, player group B, and player group C. The system may only use player group B to develop the signal. Based on the game score, at least a second multimedia event is generated, step 414. The second multimedia event can be a single event or a sequence of events. Finally, the second multimedia event is displayed to the player, step 416. Once the system displays the second multimedia event, control is returned to step 408 to determine whether additional biometric input is needed. Finally, while shown as discrete steps, displaying multimedia events and processing the biometrics may occur substantially simultaneously.

Prior to explaining the details associated with the development of composite multiplayer composite biometric inputs, examples of game play associated with the present invention will be provided. These examples are for illustrative purposes only.

Consider a networked-based multiplayer game event where a multitude of players are connected through individual or shared computers. The biofeedback sensors could be monitoring, for example, variable heart rate. The multimedia event being displayed is a village suffering a drought. The goal of the game event is to cause rain on the village. In order to cause the needed rain, the players are instructed to perform a particular technique, such as a breathing technique, that influence variable heart rate, which is being monitored by the biofeedback sensors. The signals from all the players are processed into a composite signal. Based on the composite signal, the appropriate multimedia event may be, for example, a drizzle for a poor composite score, a downpour for an excellent composite score, somewhere between a drizzle and a downpour for the spectrum of responses between poor and excellent, or the like. Using the above referenced player groups, instead of forming a composite signal from all the registered players, player group A may be assigned the east side of the village for rain, player group B may be assigned the west side of the village for rain. Thus, it may be no rain or drizzle in some sections, a downpour in others based on the player group response. For an additional twist, player group C could be used to combat the rain, in other words, output from group C might be used to lower the composite scores of other groups thus creating a competitive environment.

While an entire game could be developed using simply biofeedback inputs, it would also be possible to integrate biofeedback components into networked game environments that exist. For example, a "guild" (a.k.a player group) of EVERQUEST could try to conquer an empire using conventional techniques, such as, for example, deploying soldiers and fighting. Alternatively, the "guild" could try to conquer the empire using a meditative technique. Cooperative techniques could be as simple as two players working together. For example, in a joust the knight player may need to feel enraged to build up strength to hold a lance while a squire may need to feel calm so the horse runs fast and straight. Similarly, in a random encounter, a player may attempt to shoot a beast, but can only operate the gun if the biometric input indicates a relatively calm state.

Figure 5:
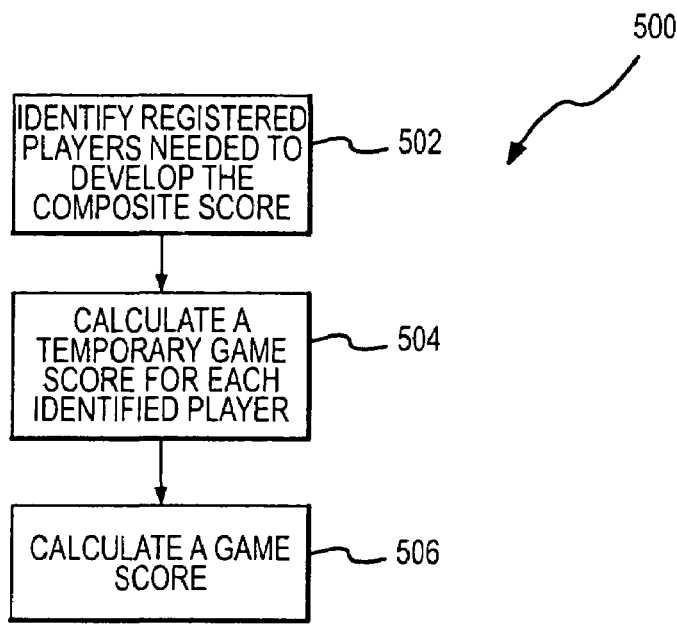
FIG. 5 is a representative flowchart illustrative of a method of generating a game score consistent with an embodiment of the present invention.

Referring to FIG. 5, a flowchart 500 is shown for developing a composite score. First, the game platform identifies the registered players needed to develop the composite score, step 502. This identification could be a single player, a group of players, all players, or the like. Next, the system calculates a temporary game score for each identified registered player based on the appropriate biometric input or inputs, step 504. Once each individual temporary game score is generated, a game score is calculated from the temporary game scores, step 506. The game score can be an average of the temporary game scores. Instead of the average game score, the system could use the median score, total sum, or some other formulaic combination. For example, the composite game score could be a weighted average, a time weighted average, a weighted differential equation or the like. The signal interfaces, local game platforms, or server could calculate the game scores for individual players as a matter of design choice. Generally, in networked environments, server 326 calculates the composite, but server 326 could designate a particular game platform to calculate the composite. In single game platform environments, the game platform running the game calculates the composite.

Figure 6:
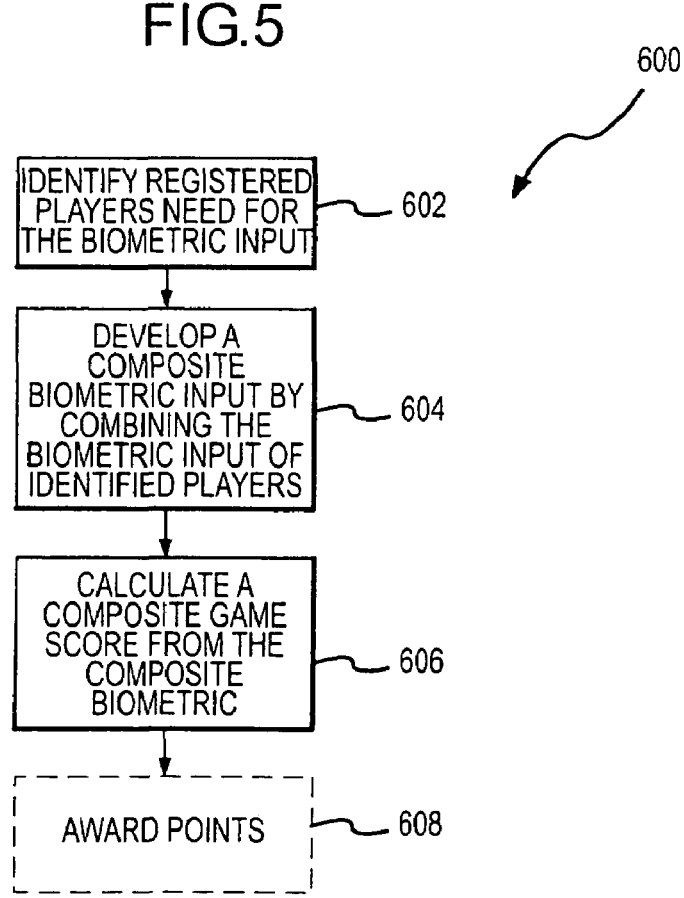
FIG. 6 is a representative flowchart illustrative of another method of generating a game score consistent with an embodiment of the present invention.

Referring now to FIG. 6, a flowchart 600 showing an alternative method of calculating a composite score or signal consistent with the present invention is shown. First, a group of registered users needed for the biometric input are identified, step 602. Next, a composite biometric input is developed by combining the biometric input from the identified players, step 604. The composite biometric may be developed from averaging the particular raw biometric input (before or after conversion to a game platform usable signal), summing the raw biometric input, or other formulaic combinations. The composite biometric is used to calculate a composite game score, step 606. Optionally, awards may be awarded to users, step 608. The award may be, for example, points, experience, additional abilities, advancement to the next event, or the like. The awards may be distributed equally to the group of users or based on individual performance. Thus, if one of the players in the group of players performed better than another of the players, the better performing player may receive more of the award.

Numerous equations could be used to composite biometric signals. The following two and three player examples using heart rate and EDR are provided for illustration and should not be considered limiting. One possible composite could be derived by using player one's EDR as a DC voltage signal and player two's heart rate as a sinusoidal riding on the DC voltage. Another composite could include player one's heart rate as a base sinusoidal signal, player two's EDR could be used to modify the weight of the sinusoidal signal, and player three's composite of player three's EDR and heart rate could control another sinusoidal signal. Still another composite could be where player one's heart rate controls a frequency of a signal and player two's EDR controls amplitude. Again, more players and more, other, or less biometric information could be used to composite the scores.

As can be seen, many alternatives to developing a composite game score exist. Calculating individual game scores and generating a composite or combining the individual biometrics and then calculating a composite game score are two non-limiting examples of ways to calculate a composite signal or composite score.

Figure 7:
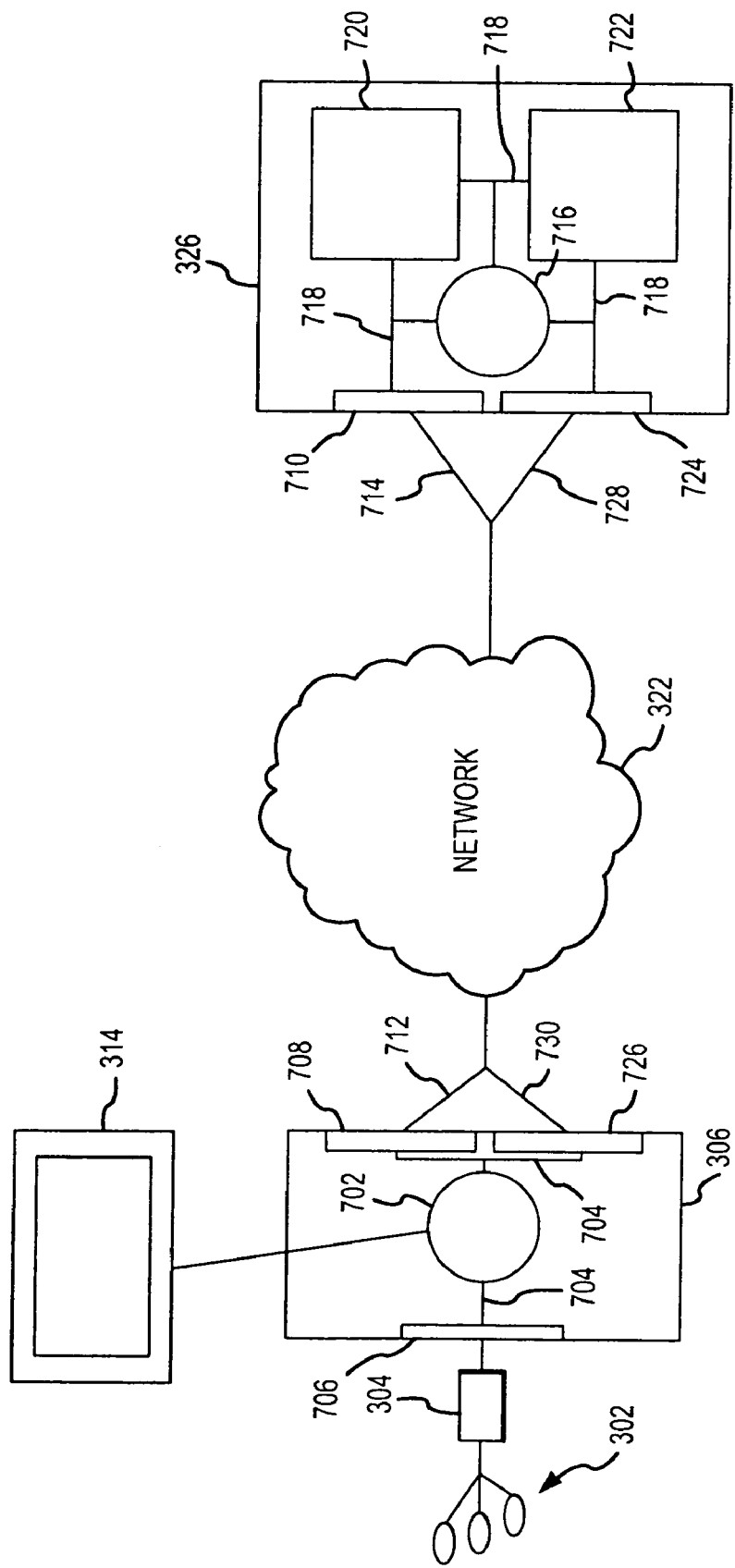
FIG. 7 is a functional block diagram of a game system consistent with an embodiment of the present invention.

Referring no to FIG. 7, a single game platform 306 and server 326 connected over network 322 is shown. While FIG. 7 shows a possible interaction between platform 306 and server 326, one of ordinary skill in the art will now recognize that the functionality of the various components can be arranged in one or more locations, such as, for example, the components shown as contained in server 326 could be integrated into platform 306, etc. Display 314 could be separate as shown or integrated into game platform 306. Game platform 306 could also be any free-standing game platform such as a personal computer, Xbox™, Gamecube™, etc.

Referring specifically to game platform 306, a first processing unit 702 can be used to execute program code and coordinate the various components of platform 306 by sending and receiving signals over bus work 704. As shown, biometric senor 302 sends biometric input to a biometric input port 706. Biometric input could be preprocessed by interface 304 and/or processing unit 702 as desired. Processor 702 directs the biometric input biometric signal output port 708. Biometric signal output port 708 transmits the biometric input to the biometric signal input port 710 over network connection 712, network 322, and network connection 714.

A second processing unit 716 can be used to execute program code and coordinate the various components of server 326 by sending and receiving signals over bus work 718. Biometric input is directed to an event engine 720. Event engine 720 uses the biometric input to generate an event sequence signal. Event sequence signal is used by a multimedia event engine 722 to generate multimedia events based on the event sequence signal. Multimedia events are transmitted by multimedia event output port 724 to multimedia event input port 726 over network connection 728, network 322, and network connection 730. The multimedia events received at multimedia event input port 726 are displayed on display 314. Network connections 712 and 730 may be the same connection and network connections 714 and 728 may be the same.

While the invention has been particularly shown and described with reference to an embodiment thereof, it will be understood by those skilled in the art that various other changes in the form and details may be made without departing from the spirit and scope of the invention.

We claim:

1. An apparatus for processing a multiplayer game configured to user biometric input, the apparatus comprising:
    at least one game platform; the at least one game platform comprising:
    a multimedia event engine to generate multimedia events based on an event sequence and transmit the multimedia events to at least one display to be viewed by a first group of users;
    at least one biometric signal input to receive variable biometric information separate from a bios input from a second group of users, the second group of users selected from a group of users consisting of: all the first group of users, at least one of the first group of users, or none of the first group of users;
    an event generation engine, the event generation engine transmitting to the first group of users a requested change in the variable biometric information and using changes in the variable biometric information from said at least one biometric signal input separate from the bios input to generate the event sequence; and
    at least one multimedia event output to transmit multimedia events to the first group of users.

2. The apparatus according to claim 1, wherein the game platform is a processor selected from a group consisting of an electronic game platform, a computer processor, a desktop computer, a server, a laptop computer, a portable electronic game, a cellular phone, or a PDA.

3. The apparatus according to claim 1, further comprising at least one bios input separate from the at least one biometric signal input.

4. The apparatus according to claim 3, wherein the bios input is selected from a group consisting of a mouse, a keyboard, an electronic pen, a track ball, a mouse pad, and a joystick.

5. The apparatus according to claim 1, further comprising at least one biometric sensor connected to the at least one biometric signal input.

6. The apparatus according to claim 5, wherein the at least one biometric sensor corresponds to the number of the second group of users.

7. The apparatus according to claim 1, wherein the at least one game platform comprises a plurality of game platforms connected by a network.

8. The apparatus according to claim 7, wherein at least one of the plurality of game platforms comprises a server.

9. The apparatus according to claim 7, wherein the network comprises at least one of a local area network, a wide area network, an Internet, a World Wide Web, and an Ethernet.

10. The apparatus according to claim 1, wherein the game platform further comprises a user identifier, the user identifier identifies the second group of users and the first group of users.

11. The apparatus according to claim 10, wherein the second group of users equals the first group of users.

12. The apparatus according to claim 1, wherein the second group of users comprises at least one user from the first group of users.

13. The apparatus according to claim 5, further comprising at least one biometric signal interface between the at least one biometric sensor and the at least one biometric signal input.

14. The apparatus according to claim 13, wherein the at least one biometric signal interface converts raw biometric information to a biometric signal input usable by the game platform.

15. A system for playing a multiplayer biometric feedback game, comprising:
- at least one server;
- at least one game platform;
- the at least one server connected to the at least one game platform through a network connection;
- at least one biometric sensor coupled to the at least one game platform;
- the at least one server comprising:
  - at least one biometric signal input port to receive a biometric signal, comprising variable biometric information, separate from a bios signal,
  - at least one multimedia event output port to output multimedia events,
  - at least one event engine to transmit to one or more players a requested change in the variable biometric information and use changes in the variable biometric information from said biometric signal, separate from the bios signal, to generate an event sequence, and
  - at least one multimedia event engine to generate multimedia events based on the event sequence to be output through the at least one multimedia event output port;
- the at least one game platform comprising:
  - at least one biometric input port to receive biometric input from the at least one biometric sensor,
  - at least one biometric signal output port to output the biometric signal,
  - at least one multimedia event input port to receive multimedia events, and
  - at least one display to display the received multimedia events.

16. The system according to claim 15, further comprising at least one processor, the processor generates a game score based on biometric input received from the at least one biometric sensor.

17. The system according to claim 16, wherein the at least one processor is located within the server.

18. The system according to claim 16, wherein the at least one processor generates the game score based on a composite of individual game scores.

19. The system according to claim 15, further comprising at least one bios input coupled to the at least one game platform, whereby the at least one bios input is transmitted to the at least one server and used by the multimedia event engine to generate multimedia events.

20. The apparatus according to claim 15, wherein the network connection comprises a connection selected from the group consisting of a local area network, a wide area network, a World Wide Web, an Internet, and an Ethernet.

21. A system for playing a biofeedback game, the system comprising:
- at least one gaming platform, the at least one gaming platform comprising a multimedia output to display a sequence of multimedia events to at least one user, a bios input to receive bios input from a controller, a biofeedback signal input to receive variable biometric input from the at least one user separate from the bios input, and a multimedia engine to generate the sequence of multimedia events;
- at least one biometric sensor attached to the at least one user, the at least one biometric sensor coupled to the biofeedback signal input to provide biometric input; and
- a server, the server transmitting to the at least one user a requested change in the variable biometric input and using the variable biometric input separate from the bios input to provide sequence information to the multimedia engine such that the multimedia engine can generate the sequence of multimedia events.

22. The system according to claim 21, wherein the server is incorporated into the at least one gaming platform.

23. The system according to claim 21, wherein the server is remote from the at least one gaming platform and connected to the at least one gaming platform through a network.

24. The system according to claim 21, wherein the at least one gaming platform comprises a plurality of gaming platforms, and wherein the server is incorporated into one of the plurality of gaming platforms to coordinate the sequence of multimedia events displayed by the plurality of gaming platforms.

25. The system according to claim 21, wherein the controller comprises at least one of a mouse, a keyboard, or a graphical user interface.

* * * * *